Jan. 1, 1946.  L. I. PICKERT  2,392,185
AIR BRAKE
Filed Nov. 25, 1944
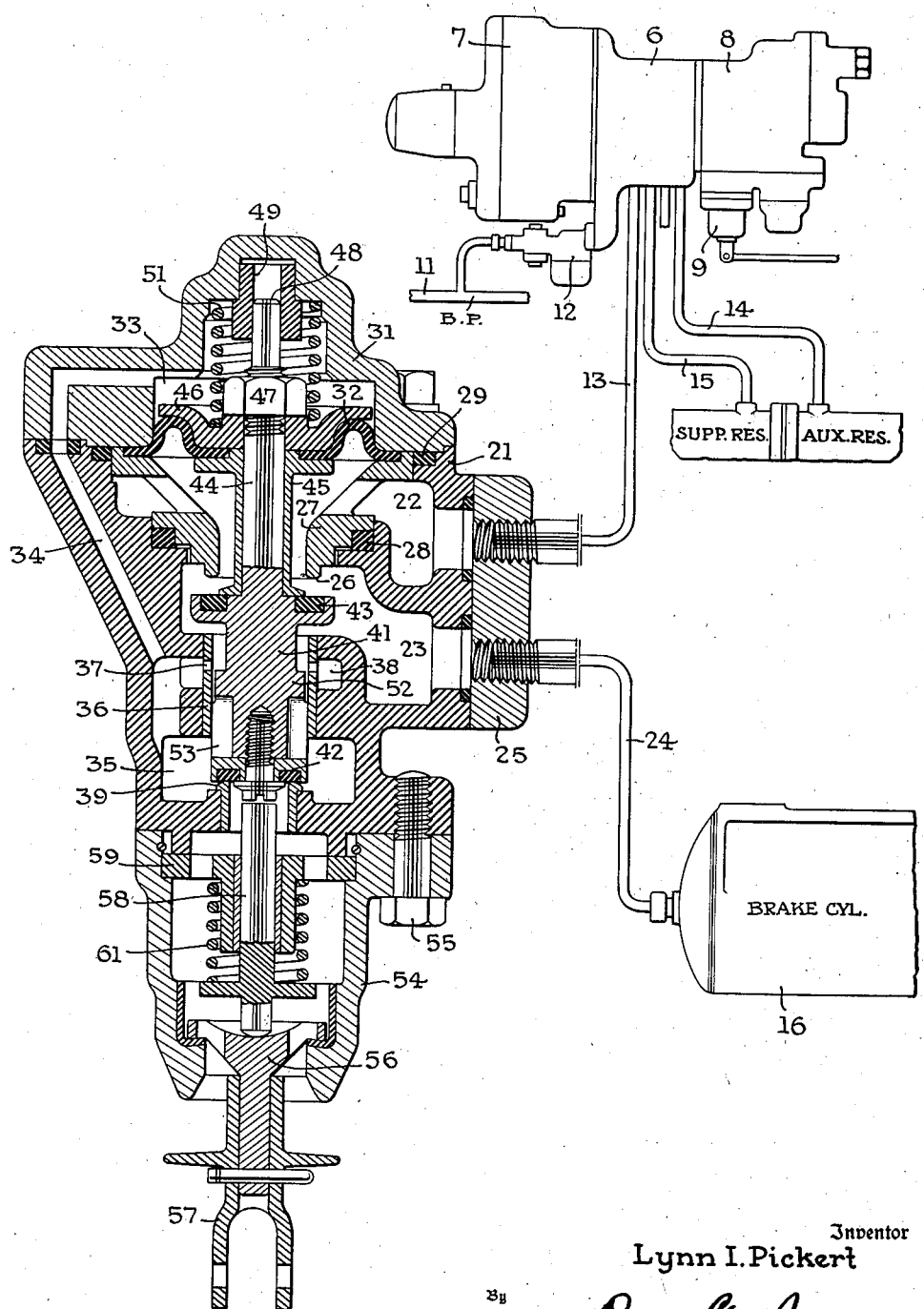
Inventor
Lynn I. Pickert
By
Attorneys Patented Jan. 1, 1946

2,392,185

UNITED STATES PATENT OFFICE 2,392,185

AIR BRAKE

Lynn I. Pickert, Watertown, N. Y., assignor to The New York Air Brake Company, a corporation of New Jersey Application November 25, 1944, Serial No. 565,087

5 Claims. (Cl. 303—68)

This invention relates to release valves, primarily intended for use in releasing the brakes on cars preparatory to setting them out of a train for switching operations.

The device can also be used to release stuck brakes.

The invention is in the nature of an improvement on the structure described and claimed in Patent 2,302,377, issued November 17, 1942, and assigned by the present applicant to The New York Air Brake Company.

In the device of the prior patent use is made of a slide valve to interrupt the connection between the brake controlling valve device (hereinafter called the control valve) and the brake cylinder and then vent the brake cylinder. This device operated with entire satisfaction but required a relatively large slide valve in order to afford ports of sufficient flow capacity. This made the device unduly large and heavy. Furthermore the use of a slide valve entails considerable expense in manufacture.

The purpose of the present invention is to retain the operating characteristics of the original device, secure a large flow capacity by the use of poppet valves, arrive at a simple and inexpensive construction and still so arrange the parts that neither the failure of the diaphragm nor the failure of the loading spring can result in the loss of braking air.

The invention will now be described with reference to the accompanying drawing in which the single figure is an axial vertical section of the release valve in its normal position, the valve being shown connected to an AB control valve and to a brake cylinder, each drawn in miniature to save space, while indicating essential connections.

The pipe bracket of an AB control valve is indicated at 6, the body of the emergency portion is indicated at 7, and the body of the service portion at 8. The usual reservoir bleed valve is indicated at 9. This bleed valve need not be dispensed with, but it would be supplanted for most purposes by the release valve of the present invention.

The brake pipe is indicated at 11 and has a branch which leads through a dust collector 12 to the pipe bracket. The brake cylinder connection appears at 13, the auxiliary reservoir connection at 14, and the supplemental reservoir connection at 15. Fragments of the two reservoirs appear in the drawing and are identified by legends.

A portion of the brake cylinder is indicated by the numeral 16.

All the parts so far described are of known construction, the AB control valve being standard on American railroads.

The release valve forming the subject of the present invention is interposed between the brake cylinder connection 13 and the brake cylinder 16.

The main body of the valve is indicated at 21 and is in the form of a casting, having a chamber 22 with which the pipe 13 communicates and a chamber 23 in free communication by a pipe 24 with the brake cylinder 16.

The body 21 is mounted on a pipe bracket 25 conventionally indicated in the drawing, the pipes 13 and 24 being connected to the bracket. The bracket could assume various forms and no attempt to illustrate it in detail has been made.

The chambers 22 and 23 are separated by a downwardly presented valve seat 26. This seat is shown as formed on an insert or spider 27 which is sealed by gaskets 28 and 29 and which is clamped by a cap 31 of the form clearly shown in the drawing.

The cap 31 is bolted to the top of the housing 21 and clamps the peripheral margin of a flexible diaphragm 32 shown as of the slack or corrugated type.

The lower side of the diaphragm is subject to the pressure in the chamber 22. The diaphragm is subject on its upper side to pressure in a chamber 33 which is connected by a passage 34 with a chamber 35 formed in the lower end of the housing 21. The chamber 23 and the chamber 35 communicate with each other through the bore of a bushing 36 which is pressed into an opening extending between these two chambers. The bushing 36 has lateral ports 37 which communicate with an annular passage 38 and through the passage 38 with passage 24 and consequently with the chambers 33 and 35.

Controlling discharge from the bottom of the chamber 35 is an upwardly presented valve seat 39 formed on the upper end of a bushing which is pressed to place. A valve body 41 carries on its lower end a rubber faced valve 42 which normally seals against seat 39 and carries at its upper end a rubber faced valve 43 which may close against the seat 26 at which time the valve 42 will be lifted from its seat 39.

The valve 42 is shown in the drawing as a separate component connected to the valve body 41 by a machine screw. The valve 43 is formed integrally with the body. An upwardly extending stem 44 passes through the center of the diaphragm 32 and is clamped to the center of the diaphragm by a flanged sleeve 45, a thrust plate 46, which overlies the diaphragm, and a nut 47.

The extreme upper end of the stem 44 projects above the nut 47 and is reduced in diameter as indicated at 48. This reduced end 48 is guided in a bushing 49 pressed into the cap 31. A biasing spring 51 of moderate strength urges the diaphragm 32, the stem 44 and the valve body 41 downward so that the valve 42 is normally seated and the valve 43 is normally unseated. The valve body 41 has a peripheral flange or rim 52 which encircles it between the valves 42 and 43, the flange being so located that when valve 42 is closed, the flange 52 fully exposes the ports 37. However if the body 41 is moved upward sufficiently to close the valve 43 against the seat 26, the ports 37 are throttled but not completely closed.

The valve body 41 is centered and guided in the bushing 36 by radial wings 53.

A housing 54 of the form shown is attached to the bottom of the housing 21 by machine screws, one of which appears at 55. The housing 54 has an internally flanged opening in its lower end in which is mounted a universally tiltable actuator comprising a ported head 56 which seats at its margin on the internal flange in housing 54 and which has at its lower end a fork 57 to which an actuating rod may be attached.

Resting on the head 56 is the lower end of a stem 58 which is guided by a guideway formed in a spider 59 clamped between the housings 21 and 54. The rim of the spider has through-ports as shown. The stem 58 is biased downward by a spring 61. If the head 56 is tilted in any direction the effect is to force the stem 58 upward, and since the stem 58 is aligned with the valve body 41, the effect of tilting the head 56 is to force the valve body 41 upward against the resistance of spring 51 so as to open the valve 42, throttle the ports 37 and close the valve 43.

Operation

The parts are shown in their normal positions. Suppose that a brake application is made by reducing pressure in the brake pipe 11. The AB control valve will function in the normal way to admit air under pressure to the pipe 13. This air will flow to chamber 22, thence past valve seat 26 into chamber 23 and by pipe 24 to the brake cylinder 16 causing application of the brakes. At the same time air will flow freely through the ports 37 to the space 33 above the diaphragm 32. Consequently the admission of pressure to the pipe 13 will develop little if any upward-acting pressure differential on the diaphragm 32.

If while the brakes are applied the head 56 be tilted so that the valve body 41 is forced upward, the effect will be to isolate chambers 22 and 23 from one another, throttle but not close the ports 37 and rapidly vent space 33 by way of passage 34 to chamber 35 and from chamber 35 through seat 39 to atmosphere through the ported spider 59 and the ported head 56. This establishes a retaining upward differential pressure on the diaphragm 32 sufficient to hold the valve 43 closed. Obviously this differential pressure must overcome the stress of the spring 51 and the pressure acting on the small area of valve 43 which is exposed within seat 26. The parts are designed to meet this requirement.

The effect is to disconnect the chambers 22 and 23 and exhaust the chamber 23 by flow past flange 52 to chamber 35 and thence to atmosphere. Consequently the brake cylinder will remain vented as long as pipe 13 remains under pressure. If the AB control valve moves to release position and vents the pipe 13, the consequent venting of chamber 22 will permit the spring 51 to restore the release valve to the position shown in the drawing.

If a car is to be cut out of a train which is stopped with the brakes applied, the pull rod attached to the member 57 is operated in any direction forcing the valve body 41 up, closing the brake connection 13 and venting the brake cylinder. The existing charges in the reservoirs would be retained and only the air in the brake cylinder will be vented. After this operation, the brake pipe is disconnected and the car can be cut out of the train and switched at will. When the car is again connected in a train and the brake pipe is charged, the resulting shift of the AB control valve to release position will vent pipe 13 and consequently restore the release valve to normal condition.

In case of a stuck AB control valve, operation of the release valve as above described will vent the brake cylinder and maintain the brake equipment on that car inoperative until the control valve moves back to release position. If the control valve does move to release position, the release valve resets and restores the brake equipment on the car to normal operating condition.

While the invention has been described and discussed as used with a control valve of the AB type, it is available for use between any control valve and its brake cylinder. It is peculiarly valuable with the AB control valve because that valve is used for freight service and requires large reservoir volumes. Furthermore freight trains are very long so that the time required for charging reservoirs entails serious delays in train movement. The device can, however, be used with a single reservoir control valve, such for example as the well known K type triple valve. It can be used also with control valves on passenger cars.

What is claimed is:

1. A release valve for interposition between a control valve and a brake cylinder normally controlled thereby, comprising in combination a double beat poppet valve having a normal position in which it connects the control valve and the brake cylinder and an abnormal position in which it disconnects them and vents the brake cylinder; means exerting on the valve a moderate bias toward normal position; a double acting pressure motor charged by the control valve during brake applications, connected to said poppet valve, and controlled at least in part by throttling means so related to the poppet valve that pressures in the motor are balanced rendering the motor inert when the poppet valve is in normal position, but are unbalanced when the poppet valve is moved away from normal position, such unbalance creating a dominant bias toward abnormal position; and means operable to force the poppet valve away from said normal position sufficiently to develop said dominant bias.

2. The combination defined in claim 1 in which the double acting motor comprises a movable abutment always subject on one side to braking pressure developed by the control valve and on the other side to pressure in a chamber which is freely vented by the poppet valev when in its abnormal position, and the throttling means restricts a passage always at least partially open between the brake cylinder and said chamber.

3. A release valve comprising in combination a valve housing having a control valve connection, a brake cylinder connection, a valve seat controlling a free communication between said connections and an opposed valve seat controlling a vent from the brake cylinder connection; a double beat poppet valve adapted to close against said seats selectively, said valve having a normal position in which it closes against the second named valve seat and a releasing position in which it closes against the first named valve seat; yielding means biasing said valve toward normal position; a movable abutment connected to said valve and always subject to pressure in the control valve connection in a direction to urge the valve toward releasing position; means forming a chamber on the opposite side of said abutment and in free communication with the vent valve seat; means associated with the double beat valve and serving to place said chamber in free communication with the brake cylinder connection when the valve is in normal position, and to restrict said communication at other times; and means for forcing said valve toward said releasing position.

4. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; a double beat poppet valve connected with said abutment to be shifted between two functional positions by the reverse movement of the abutment, said valve including means effective in one of said functional positions to restrict a normally open communication between the brake cylinder and the second working space, the two functional positions of the valve being a normal position assumed when the abutment is shifted toward the first working space in which the brake cylinder, control valve and second working space are in free communication with one another, and a releasing position in which the brake cylinder and control valve are disconnected from one another, the brake cylinder is in restricted communication with the second working space and the latter is freely vented to atmosphere; yielding means insufficient to resist effective braking pressure in the first working space and biasing the abutment toward that space to establish the normal position of the valve; and manually operable means for effecting a shift of said valve toward releasing position.

5. A release valve comprising in combination a valve housing having a control valve connection, a brake cylinder connection, a valve seat controlling a free communication between said connections, an opposed valve seat controlling an atmospheric vent, and a flow regulator ported to permit flow between the brake cylinder connection and the vent valve seat; a double beat poppet valve adapted to close against said valve seats selectively and having means serving in one position of the valve to throttle but not close the ports in said flow regulator, said valve having a normal position in which it closes against the second-named valve seat and exposes the ports in said flow regulator and a releasing position in which it closes against the first-named valve seat and throttles the ports in said flow regulator; yielding means biasing said valve toward normal position; a movable abutment connected to said valve and subject to pressure in the control valve connection in a direction to urge the valve toward releasing position; means forming a chamber on the opposite side of said abutment and in free communication with the flow regulator ports and vent valve seat; and manually operable means for forcing said valve toward releasing position.

LYNN I. PICKERT.